Figure 4:
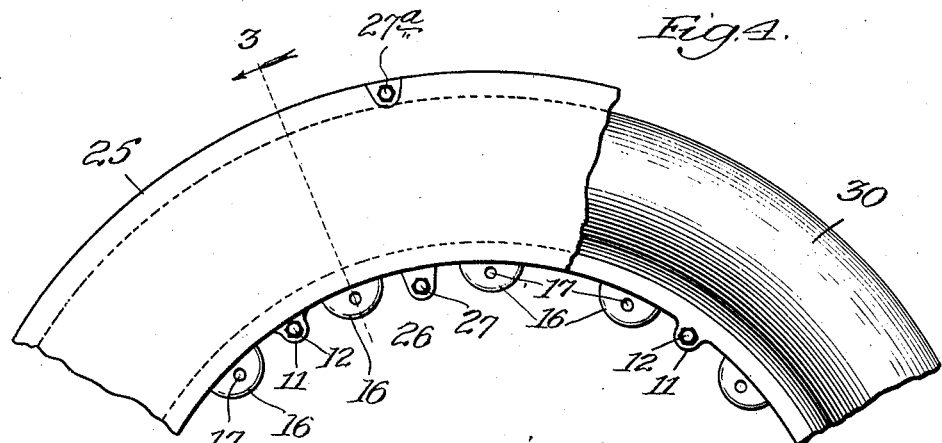

June 14, 1927.
W. C. MARTIN
METHOD OF MANUFACTURING CUSHION TIRES
1,632,490
Original Filed Feb. 20, 1922   2 Sheets-Sheet 1
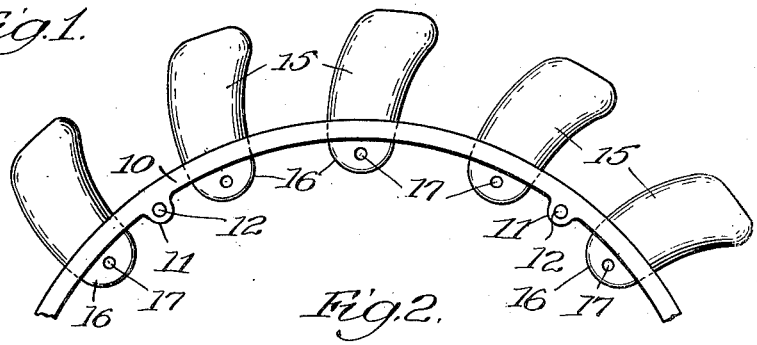
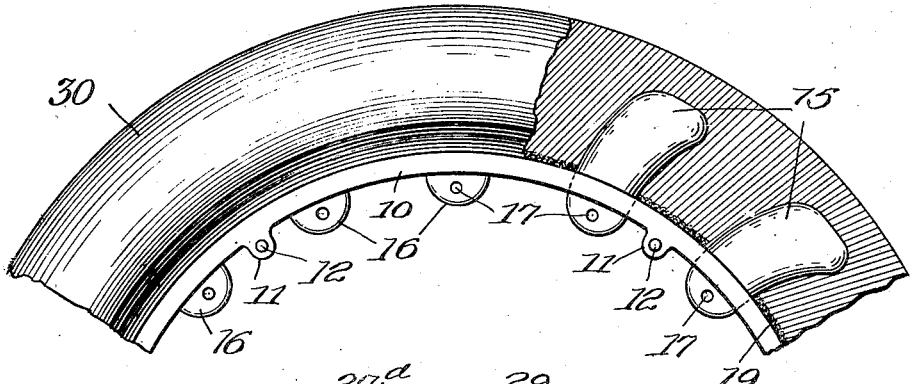
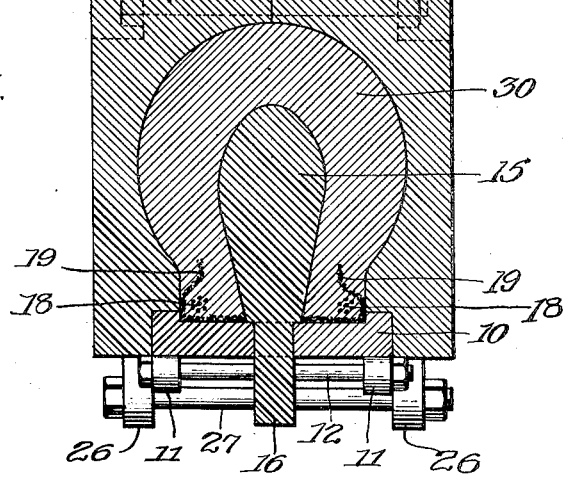
Inventor
William C. Martin
By Dyrenforth, Lee, Chritton & Wiles,
Attys.

June 14, 1927.

W. C. MARTIN 1,632,490

METHOD OF MANUFACTURING CUSHION TIRES

Original Filed Feb. 20, 1922    2 Sheets-Sheet 2

Inventor:
William C. Martin
By Dyrenforth, Lee, Chritton & Wiles
Attys.

Patented June 14, 1927.

1,632,490

UNITED STATES PATENT OFFICE.

WILLIAM C. MARTIN, OF MILWAUKEE, WISCONSIN.

METHOD OF MANUFACTURING CUSHION TIRES.

Original application filed February 20, 1922, Serial No. 537,912. Divided and this application filed November 20, 1926. Serial No. 149,663.

This invention relates particularly to an improved method of manufacturing a cushion tire which can be substituted for a pneumatic tire on a motor vehicle. The tires manufactured in accordance with the improved process are especially well adapted for use in connection with commercial motor vehicle and trucks, and, particularly, for vehicles having a capacity ranging from a half ton to a ton and one-half.

In accordance with the improved process, an annular mandrel equipped with cavity-forming cores has placed thereon a strip, or strips, of fabric provided centrally with slots through which the cavity-forming cores extend; pieces and strips of rubber stock are placed upon the fabric and between and about the cores; the marginal portions of the fabric-strips are then bent outwardly (radially) and inwardly over the previously placed rubber stock; additional rubber stock is then placed over and about the cores to form roughly the contour of the tire; and the carcass thus formed is then placed in a mold and subjected to a vulcanizing operation.

The accompanying drawings illustrate the practice of the invention and the apparatus adapted to such practice. In the drawings—

Figure 5:
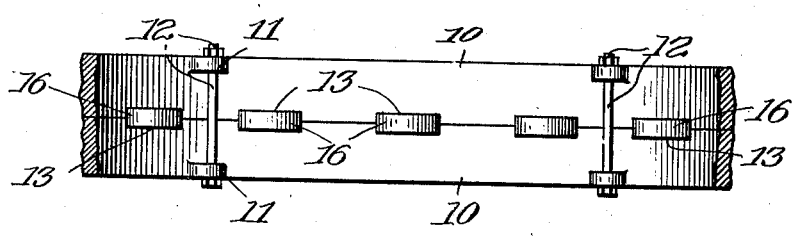
Figure 6:
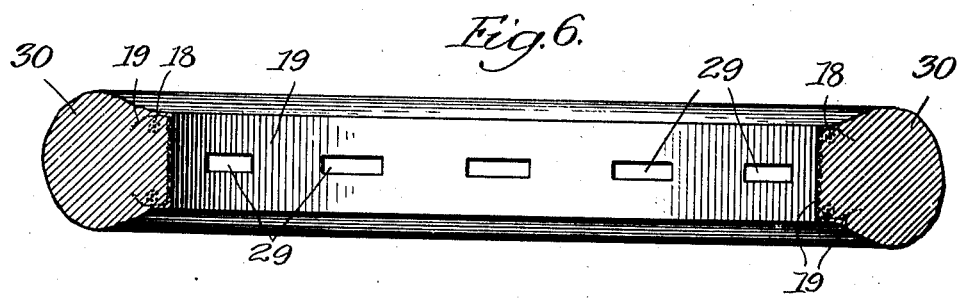
Figure 7:
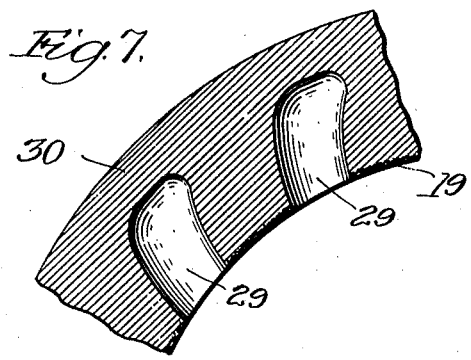

Fig. 1 is a broken side elevational view of a supporting base, or annular mandrel, equipped with cavity-forming cores; Fig. 2 is a broken view of a tire after removal of the mold-plates and before removal of the supporting mandrel and cavity-forming cores; Fig. 3 is a sectional view of the apparatus, showing the tire in the mold; Fig. 4 is a broken side elevational view with a part of the mold broken away to expose the tire; Fig. 5 is an inner broken view of the sectionally constructed ring, or annular mandrel, showing also the inner extremities of the cavity-forming cores: Fig. 6 is a sectional view of the completed tire; and Fig. 7 is a broken sectional view of the tire, the section being taken in the plane of the tire.

As shown in the drawings, 10, 10 indicate two rings provided with lugs 11, adapted to be engaged by bolts 12 to hold the rings tightly together. Each of the rings 10 is provided with a series of rectangular notches 13. These notches are adapted to register when the rings are together to form the rectangular openings, which will also be indicated by 13. 15, 15 indicate cavity-forming cores, which may be made of cast iron or any suitable material. These cores are substantially shoe-shaped but slightly curved, each having a tongue 16 on one end provided with a hole 17. The tongues 16 are just large enough to fill the rectangular openings 13 and to be gripped therein when the rings 10 are bolted together.

In making the tire, the rings 10 are bolted together with the cores 15 in place, as shown in Fig. 1. The wire beads 18 and strips of fabric 19 are then put in place, and rubber stock is placed between and over the cores 15 to form the tire in the proper shape, as shown. The mold is then placed over the rubber. This mold is then subjected to heat and pressure to accomplish the necessary vulcanizing and treating of the rubber to make the completed tire. This mold is formed of two halves, indicated by 25, 25, as shown, provided with lugs 26 adapted to accommodate bolts 27 to hold the two parts of the mold together. Additional bolts 27ª are provided near the outer periphery to assist in holding the two parts together. After the tire has been properly vulcanized and properly treated, the two halves of the mold are removed. The two rings 10, 10 are then removed. This leaves the completed tire with the cores 15 still in place. These cores are removed by placing a suitable hook in the hole 17 and forcibly pulling the cores out, thus leaving the air cells 29 in the completed tire 30. In pulling the cores out, the rubber will spread to permit their withdrawal.

It will be noted that the rings 10 form a foundation or base on which the skeleton of the tire is formed. Also that the fabric 19 is provided with a series of slots through which the base portions of the cores 15 extend, as will be observed in Figs. 2 and 3. Also, as illustrated in Figs. 3 and 6, the edge portions of the fabric are bent outwardly (radially) from the foundation rings 10 and are disposed between the pieces of rubber, so that when the tire is vulcanized the out-turned margins are vulcanized in the rubber and firmly anchored therein, as may be readily understood from Fig. 3. Also, as will be understood from Fig. 3, the base of the tire affords what is known as the straight-faced sides or flanges which are gripped between the flanges of the rim on the wheel when the tire is mounted on the rim. Thus, the tire is adapted to take the place of an ordinary pneumatic tire.

It will be noted that rubber walls between the air cells provide suitable anchors to secure the tire to the rim, and also serve as driving or traction arms engaging both the rim and the carcass of the tire on the inside circumference. These walls also provide resiliency in addition to the air cells. It is also to be noted that the cells with their dividing walls are curved. The tire should be preferably put on the wheel so that when it is in running motion it will run with the curve of the walls. It is not absolutely necessary, however, that the tire always run in one direction.

It will be noted that the openings of the air cells are adjacent the rim when the tire is in place. It will be seen, therefore, that the rim covers such openings, thus confining the air therein. If desired, additional sealing means, such as a strip of self-healing rubber, or cementitous material may be placed between the rim and the tire as the tire is put in place, in order to assist in covering and sealing the openings of the air cells.

The improved tire produced by the method described has proven to be well adapted for use in connection with commercial motor vehicles, such as fleets of delivery vehicles employed by stores, and motor trucks, or the like, of medium capacity, say a capacity of from a half ton to a ton and one-half. It has been found advantageous to remove pneumatic tires, for example, from such vehicles, and replace them by cushion tires made in accordance with the present method.

The present application constitutes a division of my application No. 537,912, filed February 20, 1922.

The foregoing detailed description has been given for clearness of understanding only and no unnecessary limitations should be understood therefrom, it being the intent to claim the invention as broadly as permissible in view of the prior art.

What I regard as new, and desire to secure by Letters Patent, is:

1. The method of making a cushion tire which comprises supporting a fabric provided with slots on a sectional annular base equipped with radiating cavity-cores which project through said slots, placing pieces of rubber upon said fabric and about said cores and lodging the margins of said fabric in the rubber, applying a mold to the structure, subjecting the structure in the mold to vulcanizing action, and removing the mold and sectional base.

2. The method of making a tire which comprises supporting on a sectional annular base separately formed detachable cores, placing on said base an annulus of fabric provided with slots through which the base-portions of said cores extend, placing pieces of rubber between and over said cores and on said fabric and lodging the margins of said fabric in the rubber, applying a mold to the structure, subjecting the structure in the mold to vulcanizing action, removing the mold and sectional base, and withdrawing the separately formed cores from the tire.

WILLIAM C. MARTIN.